United States Patent [19]

Johnson et al.

[11] 4,202,798

[45] May 13, 1980

[54] PHOSPHOROUS-CONTAINING CATALYST AND METHOD FOR PREPARING AND USING SAME

[75] Inventors: Marvin F. L. Johnson, Homewood; Henry Erickson, Park Forest, both of Ill.

[73] Assignee: Atlantic Richfield Company, Philadelphia, Pa.

[21] Appl. No.: 955,661

[22] Filed: Oct. 30, 1978

Related U.S. Application Data

[63] Continuation of Ser. No. 559,983, Mar. 19, 1975, abandoned, which is a continuation of Ser. No. 369,265, Jun. 12, 1973, abandoned.

[51] Int. Cl.$^2$ .............................................. B01J 27/18
[52] U.S. Cl. .................................... 252/437; 252/435; 208/216 PP; 208/217; 208/254 H
[58] Field of Search ................................. 252/435, 437

[56] References Cited

U.S. PATENT DOCUMENTS

| | | | |
|---|---|---|---|
| 2,441,297 | 5/1948 | Stirton | 252/437 X |
| 3,232,887 | 2/1966 | Pessimisis | 252/435 |
| 3,879,310 | 4/1975 | Rigge et al. | 252/437 X |

OTHER PUBLICATIONS

Rose, "The Condensed Chemical Dictionary," Fifth Edition (1956), Pub. by Reinhold Pub. Corp. N.Y., N.Y. pp. 51, 959 & 960.

*Primary Examiner*—Patrick Garvin
*Attorney, Agent, or Firm*—Frank J. Uxa, Jr.

[57] ABSTRACT

An improved method for preparing a hydrocarbon hydrotreating catalyst containing a major amount of alumina and a minor amount of at least one Group VIB or Group VIII metal comprising:

(1) contacting an aqueous mixture of hydrous alumina with at least one phosphorus-containing compound in an amount sufficient to increase the hydrocarbon hydrotreating activity of the final catalyst and forming a phosphorus-containing hydrous alumina;

(2) calcining the phosphorus-containing hydrous alumina and forming a calcined alumina;

(3) contacting the calcined alumina with at least one metal-containing compound and forming a metal-containing material, the metal being selected from the group consisting of Group VIB metal, Group VIII metal and mixtures thereof; and (4) calcining the metal-containing material and forming a catalyst having increased hydrocarbon hydrotreating activity.

Improved hydrocarbon hydrotreating processes and catalysts are also disclosed.

8 Claims, No Drawings

PHOSPHOROUS-CONTAINING CATALYST AND METHOD FOR PREPARING AND USING SAME

This is a continuation of application Ser. No. 559,983, filed Mar. 19, 1975, now abandoned, which is a continuation of Ser. No. 369,265, filed June 12, 1973, now abandoned.

The present invention relates to improved hydrocarbon hydroconversion catalysts and methods for preparing and using same. More particularly, the present invention relates to improved hydrocarbon hydrotreating catalysts comprising alumina, phosphorus and at least one catalytic metal, and improved methods for making and using same.

Hydrocarbon hydrotreating has become increasingly more important because of the demand for high quality hydrocarbon feedstocks and products, e.g., materials with reduced sulfur and/or nitrogen contents. Broadly, hydrocarbon hydrotreating refers to a process wherein a hydrocarbon material containing an undesirable contaminant, e.g., sulfur, nitrogen and the like, is contacted with a catalyst in the presence of hydrogen at conditions to form compounds of the undesirable contaminants which can be removed from the hydrocarbon material by conventional means, e.g., simple distillation and the like. In many instances, the catalyst used comprises alumina and at least one metal in an amount effective to promote the hydrocarbon hydrotreating. In order to increase hydrocarbon hydrotreating process efficiency, it would be advantageous to provide a catalyst having improved properties, e.g., improved hydrocarbon hydrotreating activity.

Therefore, one of the objects of the present invention is to provide an improved hydrocarbon hydrotreating catalyst.

An additional object of the present invention is to provide an improved method for producing a catalyst having improved hydrocarbon hydrotreating activity.

A further object of the present invention is to provide an improved hydrocarbon hydrotreating process. Other objects and advantages of the present invention will become apparent hereinafter.

An improved method for preparing a hydrocarbon hydrotreating catalyst comprising a major amount of alumina and a minor amount of at least one metal selected from the group consisting of Group VIB metal, Group VIII metal and mixtures thereof has now been discovered. The improved method comprises:

(1) contacting an aqueous mixture of hydrous alumina with at least one phosphorus-containing compound including at least one acidic hydrogen atom, i.e., phosphorus acids, in an amount sufficient to increase the hydrocarbon hydrotreating activity of the final catalyst, hereinafter described, and forming a phosphorus-containing hydrous alumina;

(2) calcining the phosphorus-containing hydrous alumina and forming a calcined alumina;

(3) contacting the calcined alumina with at least one metal-containing compound and forming a metal-containing material, the metal being selected from the group consisting of Group VIB metal, Group VIII metal and mixtures thereof, and being present in the metal-containing material in an amount so that the final catalyst formed therefrom comprises a catalytically effective amount of the metal; and (4) calcining the metal-containing material and forming a final catalyst having increased hydrocarbon hydrotreating.

Thus, the above method has been found to provide a new and improved composition of matter. The phosphorus-containing compound interacts with the hydrous alumina in an as yet undetermined fashion to promote the hydrocarbon hydrotreating activity of the final catalyst suprisingly without substantially adversely affecting the other properties, e.g., surface area, pore volume and the like, of the final catalyst.

The aqueous mixture contacted in step 1 of the above method preferably comprises from about 5% to about 70%, more preferably from about 30% to about 70% by weight, of hydrous alumina (calculated as $Al_2O_3$). The hydrous alumina used may be prepared by various methods known in the art. Thus, for instance, hydrated alumina can be precipitated from an aqueous solution of a soluble aluminum salt such as aluminum chloride. Ammonium hydroxide is a useful agent for effecting the precipitation. Control of the pH to maintain it within the values of about 4 to about 10 during the precipitation is desirable for obtaining a good rate of conversion. Extraneous ions, such as halide ions, which are introduced during preparation of the hydrogel can, if desired, be removed by filtering the alumina hydrogel from its mother liquor and washing the filter cake with water. Also, if desired, the hydrogel can be aged, say for a period of several days, prior to utilizing it in the method of the present invention. The effect of such aging is to build up the concentration of alumina trihydrates in the hydrogel. Such trihydrate formation can also be enhanced by seeding the slurries with crystallites, of, for example, gibbsite. Thus, for instance, a major amount, preferably from about 50 percent to about 95 percent, of the alumina content in the mixture of step (1) of the method can be in the trihydrate form, e.g., as one or more of bayerite, gibbsite or nordstrandite (previously called randomite). Preferably, the hydrous alumina used in the mixture of step 1 predominates in a material selected from the group consisting of alumina monohydrate, alumina trihydrates, amorphous hydrous alumina and mixtures thereof. More preferably, this hydrous alumina predominates in a material selected from the group consisting of alumina monohydrate, amorphous hydrous alumina and mixtures thereof, particularly, alumina monohydrate.

The hydrous alumina thus formed may be dried prior to being formed into an aqueous mixture for contacting in step 1 of the present method. This drying may be preferred in order to obtain a solid product which can be readily comminuted and/or more easily handled and worked with. This drying can be accomplished in various manners, for example, by drum drying, flash drying, spray drying, tunnel drying and the like, with spray drying being preferred. The drying temperature of the hydrous alumina should be kept below the point at which substantial amounts of water of hydration, i.e., combined water, are released from the alumina. Usually, this drying will be carried out at temperatures below about 500° F.

In any event, an aqueous mixture comprising the hydrous alumina is contacted with at least one phosphorus acid. It is not critical to the present invention in what order the components are combined in step 1. For example, water containing the phosphorus acid can be combined with dried hydrous alumina; the phosphorus acid or a concentrated mixture of water and phosphorus acid can be combined with an aqueous mixture of hydrous alumina; or the phosphorus acid, water and hydrous alumina from separate sources can be combined for the contacting of step 1. The contacting of step (1) may occur in a batch system, semi-batch system or a continuous system.

This contacting takes place under conditions sufficient to increase the hydrocarbon hydrotreating activity of the final catalyst. Although the contacting conditions are not critical to the present invention, it is preferred that the contacting take place at a temperature in the range from about 35° F. to about 210° F., or more, more preferably in the range from about 50° F. to about 150° F. Contacting times in the range from about 1 minute or less to about 20 hours or more may be used, with times in the range from about 1 minute to about 1 hour being preferred. The contacting of step 1 preferably takes place at conditions, e.g., temperature and pressures, such that a substantial loss, e.g., greater than 30%, of the free water in the aqueous mixture by vaporization is avoided. Thus, for example, the contacting of step (1) may be carried out at pressures in the range from about 1 atmosphere to about 10 atmospheres or more.

The phosphorus acids used in the present invention are chosen to provide a final catalyst having increased hydrocarbon hydrotreating activity. Preferably, the phosphorus acid is at least partially water soluble. Also included in the term phosphorus acids are phosphorus acid precursors, that is phosphorus-containing compounds able to form compounds containing at least one acidic hydrogen atom when in the presence of water such as phosphorus oxides, phosphorus or halides and the like. Included among the phosphorus acids useful in the present invention are ortho-, pyro-, meta-, hypophosphorous acids, phosphonic acids, phosphinic acids, phosphenic acids, phosphinic acids, phosphenic acids, phosphoranoic acids, phosphoranedioic acids, phosphoranetrioic acids, phosphorcinetetroic acids, phorphoranepentoic acids and mixtures thereof. Preferably, the phosphorus acids used is selected from the group consisting of phosphoric acid, phosphorous acids and mixtures thereof. Of course, mixtures of two or more phosphorus acids may be utilized. Substituted forms of the phosphorus acids also may be used. Suitable substitutents are chosen so as not to materially interfer with the functions of the phosphorus acids in the present invention. Such substituents include: halide, such as fluoride, chloride, bromide and the like; $NH_4$; $CN$; monovalent essentially hydrocarbonaceous radicals containing from about 1 to about 30 or more carbon atoms and the like. Among the monovalent essentially hydrocarbonaceous radicals which may be substituted on to the phosphorus acids are alkyl and alkenyl such as methyl, ethenyl, butyl, butenyl, octyl, octenyl, hexyldecyl, hexyldecenyl and the like; aryl such as phenyl, naphthyl and the like; and alkaryl, alkenaryl, aralkyl and aralkenyl such as methyl-, butyl- and decyl-phenyl, ethenyl-butenyl-and decenyl-phenyl, benzyl, phenyl butyl, phenyl decyl, phenyl ethenyl, phenyl bitenyl, phenyl deconyl and the like. Substituted monovalent hydrocarbonaceous radicals may be used, for example, to improve water solubility of the acid, provided that the substituent does not interfere with the functions of the phosphorus acids.

In a more preferred embodiment, the phosphorus acid used in step 1 is selected from the group consisting of phosphoric acids and mixtures thereof. The term phosphoric acids includes compounds which form phosphoric acids in the presence of water. It is preferred that the phosphorus acid be present in step 1 in an amount such that at least about 0.01 moles, more preferably from about 0.01 mole to about 2.0 moles, more preferably from about 0.05 mole to about 1.0 moles, of phosphorus is present per mole of alumina (calculated as $Al_2O_3$).

The contacting of step 1 forms a phosphorus-containing hydrous alumina which can, if necessary, be dried in a manner similar to that described previously for the hydrous alumina.

This phosphorus-containing hydrous alumina is to be calcined. However, prior to this calcination, it is preferred that this material be formed into macrosized particles of a size suitable for use as a hydrocarbon hydrotreating catalyst. Forming the phosphorus-containing hydrous alumina into macrosize particles can be performed, for example, by tabletting, extruding and the like.

In the case of tabletting, it is preferred to incorporate in the phosphorus-containing hydrous alumina a minor amount of a die lubricant which is either substantially non-deleterious to the final catalyst or which can be removed by a subsequent calcining step. Often employed, for example, are organic compounds, e.g., polyethylene, which, by calcining the formed particles in an oxidizing atmosphere, can be subsequently burned away.

When macroforming by extrusion, sufficient water should be present in the phosphorus-containing hydrous alumina to provide a workable dough. This can be accomplished by terminating the drying of the phosphorus-containing hydrous alumina once the free water content of the material has reached about 20 to about 60, preferably from about 20 to about 40, weight percent. However, it may be preferred to first dry the phosphorus-containing hydrous alumina to obtain a material which is low enough in water content to be readily comminuted, then, if necessary, comminute the material to a small particle size, add back water to achieve a dough-like consistency and then extrude the water-phosphorus-containing hydrous alumina mixture into macrosize particles.

The size selected for the macrosize particles can be dependent upon the intended environment in which the final catalyst is to be used—as, for example, whether in a fixed or moving bed reaction system. Thus, for example, where, as in the preferred embodiment of the present invention, the final catalyst composition is designed for use as a catalyst in hydrocarbon hydrotreating operations employing a fixed bed of catalyst, the phosphorus-containing hydrous alumina will preferably be formed into particles having a minimum dimension of at least about 0.01 inch and a maximum dimension up to about one-half inch or one inch or more. Particles having a diameter of about 0.03 inch to about 0.25 inch, preferably about 0.03 inch to about 0.15 inch, are often preferred, especially for use in fixed bed hydrotreating operations.

Calcining of the phosphorus-containing hydrous alumina, e.g., in the form of macroformed particles, according to step (2) of the method is performed at temperatures sufficient to effect release of the water of hydration of the phosphorus-containing hydrous alumina. Generally suitable are temperatures in the range from about 600° F. to about 1200° F., preferably from about 850° F. to 1000° F. This calcination takes place preferably over a period of time of at least about ½ hour, more preferably over a period of time in the range from about 1 hour to about 6 hours. The calcination can be effected in an inert atmosphere such as nitrogen, as well as in either an oxidizing or reducing environment. Thus, either oxygen-containing gases, such as dry air, or hydrogen-containing gases may be advantageously employed. Inert diluent gases such as nitrogen can be present in admixture with the oxygen or hydrogen. It is usually advantageous to conduct the calcination in a flowing stream of the gaseous atmosphere. Atmospheric, super-atmospheric or sub-atmospheric pressures can be employed.

Where the phosphorus-containing hydrous alumina, e.g., in the form of macrosize particles, contains significant amounts, say about 5 weight percent or more, of uncombined water—as, for example, will usually be the case where the macroformed particles have been formed by extrusion—then, either as a separate operation or in the first stage of the calcination, the phosphorus-containing hydrous alumina can, with advantage, first be dried at a temperature below the point at which substantial amounts of combined water are released from the alumina. Higher temperatures can cause fissures and rupture of the macroformed particles. Thus, prior to being heated to as high as about 700° F., preferably prior to being heated above about 500° F., the uncombined water content of the phosphorus-containing hydrous alumina should be lowered to at least below about 5 weight percent.

The calcining of step (2) of the present invention forms calcined alumina, e.g., in the form of macrosized particles. The calcined alumina is contacted with at least one metal-containing compound to form a metal-containing material which includes an amount of such metal so that the final catalyst formed therefrom comprises a catalytically effective amount of the metal. The metal-containing compound used comprises Group VIB metals, such as chromium, molybdenum and tungsten, and/or the Group VIII iron-group and platinum group metals, e.g., iron, cobalt, nickel, platinum, iridium, osmium, palladium, rhodium and ruthenium, and mixtures thereof. The catalytic metals can be present in the final catalyst as the free metals or in combined form such as the oxides and sulfides. Preferably, the final catalyst contains catalytically effective amounts of at least one Group VIB metal and at least one Group VIII iron-group metal. Especially preferred catalysts contain nickel cobalt and mixtures thereof together with tungsten, molybdenum and mixtures thereof. The Group VIP metals are preferably present in amounts of from about 5% to about 40%, more preferably from about 10% to about 30%, by weight of the total catalyst, calculated as the weight of the Group VIB metal oxide. The Group VIII iron-group metals are preferably present in an amount of from about 2% to about 15%, more preferably from about 4% to about 10%, by weight of the total catalyst, calculated as the weight of the free metal. When they are used, the Group VIII platinum group metals preferably are present in an amount from about 0.01% to about 2%, more preferably from about 0.05% to about 1%, by weight of the total catalyst calculated as the metal. Metals and/or metal compounds in addition to the platinum group metal such as rhenium, germanium, tin and the like, may be included in the final catalyst to improve the properties of the composition.

The contacting of step (3) of the above method can be carried out as is known in the art. The metal is preferably in solution as a compound which is a precursor of the form, e.g., free metal, metal oxide or metal sulfide, desired in the final catalyst. For example, to prepare a catalyst containing nickel and molybdenum oxide ($MoO_3$), a solution of nickel nitrate and ammonium molybdate in ammonia and water can be used as the impregnating solution. The metal-containing material can then be dried, as, for example, at a temperature of about 100° C. to about 130° C. for a time such as 15 to 20 hours, and then calcined. Alternatively, ammonium molybdate can be dissolved in a solution of aqueous ammonia, prepared by admixing 29% ammonia and water in a ratio of 1.76:1, nickel nitrate is then added in this solution and forms the nickel amine complex ($Ni(NH_3)_6^{++}$). This solution can then be used as the impregnant with the metal-containing material being dried and calcined as before. After impregnation, the metal-containing material can be recalcined at the conditions, e.g., temperatures, previously noted. The impregnation of the calcined alumina with the catalytic metal solutions can also be performed sequentially, that is, for example, impregnation with a solution of ammonium molybdate in ammonia followed by drying and calcination of the particles and then impregnation of the molybdenum oxide containing support with a solution of nickel nitrate followed by another drying and calcination. Alternatively, the calcined alumina may be impregnated with the Group VIII metal first.

In any event, the metal-containing material from step (3) is calcined, for example, at the conditions noted previously for the calcination in step (2) of the present method, to form a final catalyst.

The final catalyst of the present invention preferably contains at least about 0.5% by weight of phosphorus. More preferably, the phosphorus content is from about 1.0% to about 10.0% by weight of the final catalyst. This catalyst preferably has a surface area of at least about 100 m$^2$./gm., more preferably, at least about 150 m$^2$./gm. The total pore volume of the final catalyst is preferably at least about 0.50 cc./gm., more preferably at least about 0.70 cc./gm. Other characteristics of this catalyst which may contribute to its beneficial properties have not as yet been determined. However, the method of the present invention does provide a unique and improved hydrocarbon hydrotreating catalyst.

The final catalyst can be reduced in hydrogen, as by heating the catalyst in a stream of hydrogen at a temperature of from about 400° F. to about 1000° F., preferably from about 500° F. to about 800° F. To convert the metal and/or metal oxides in the catalyst to the sulfides, the final catalyst, containing the metals in oxide form as obtained from the calcination of step (4) may be sulfided by passing hydrogen sulfide, either pure or diluted with another gas, such as, for instance, hydrogen, over the catalyst bed at temperatures usually below about 800° F., preferably from about 400° F. to about 400° F., for a time sufficient to convert a significant portion of the oxides of the metal components to their respective sulfides. Alternatively, the catalyst may be sulfided during processing by the sulfur in the feed. Also, the metals can be deposited in the sulfide form during the manufacture of the final catalyst as noted above.

The final catalyst prepared as described above is particularly useful in the hydrotreating of substantially hydrocarbon feedstocks such as sulfur-containing and/or nitrogen containing mineral oil derived from petroleum, coal, shale oil, tar sand oil and the like. Distillate feedstocks including heavy oil distillates, having end boiling points up to about 1100° F., are especially preferred. Typical distillates which may be processed using the present catalyst include those having at least about 0.5% by weight sulfur and or at least about 100 ppm. nitrogen and boiling primarily in the range from about 150° F. to about 1050° F., or more, preferably in the range from about 250° F. to about 550° F. The substantially hydrocarbon feedstock can be contacted with hydrogen over the final catalyst prepared as described above in at least one reaction zone at conditions such as a temperature, for example, in the range from about 650° F. to about 900° F., preferably from about 700° F. to about 850° F., sufficient to form compounds of the undesirable components of the feedstock, e.g., sulfur and/or nitrogen, with hydrogen which can be removed by conventional processing, e.g., flashing, simple distillation, vacuum distillation and the like. Other suitable contacting conditions include pressures from about 300 psi. to about 5000 psi., preferably from about 300 psi. to about 1500 psi.; weight hourly space velocities of from about 0.5 to about 4, preferably about 1 to about 3 and hydrogen flow rates of from about 300 to about 30,000 standard cubic feet of hydrogen per barrel of feedstock, preferably from about 300 to about 5,000 standard cubic feet of hydrogen per barrel of feedstock. In many instances, contact of the feedstock over the final catalyst as set forth above allows the recovery of at least one substantially hydrocarbon product having a sulfur concentration and/or nitrogen concentration reduced from that of the feedstock. This product recovery can be carried out using conventional techniques, e.g., flashing, distillation and the like, well known in the art.

EXAMPLE I

This example illustrates the improved method of the present invention.

982 grams of a hydrous alumina (igniyted weight 736 grams) comprising 54.5% alumina monohydrate with the remainder being amorphous hydrous alumina was placed in a mechanically powered mixer. The mixer was activated. 1150 ml. of an aqueous solution containing 171.5 ml. of 85% by weight $H_3PO_4$ was added to the mixer over a period of 10 minutes. The mixture of water, hydrous alumina and $H_3PO_4$ was mulled at ambient temperature, i.e., 72° to 75° F., and atmospheric pressure for an additional 15 minutes. The resulting phosphorus-containing hydrous alumina was extruded through a 1/16 in. die plate using a double auger extruder. The extruder was dried for 20 hours at 230° F. in a forced draft oven, broken into approximately ⅛ inch lengths and calcined in air in a muffle furnace programmed to raise the temperature 300° F./hr. to 900° F., hold 900° F. for 6 hours and cool. The product calcined alumina was found to contain 5.95% by weight of phosphorus.

162 grams of this calcined alumina was vacuum impregnated with $Ni(NO_3)_2.6H_2O$ and $(NH_4)_6MoO_7.4H_2O$, dried and calcined using conventional techniques to form the final catalyst. This final catalyst contained 5.8% nickel, 12.8% $MoO_3$ and 4.75% by weight of phosphorus. The surface area of this product is 195 $m^2$./gm. and it has a total pore volume of 0.88 cc./gm. This product has utility as a hydrocarbon hydrotreating catalyst.

EXAMPLE II

This example illustrates certain of the benefits of the present invention.

A final catalyst was prepared in the same manner as that of Example I except that the phosphoric acid contacting occurred after the hydrous alumina was initially calcined and simultaneously with the impregnation with nickel and molybdenum. This final catalyst contained 6.1% by weight of nickel, 13.0% by weight of $MoO_3$ and 6.3% by weight of phosphorus and had a surface area of 79 $m^2$./gm. and a total pore volume of 0.39 cc./gm.

EXAMPLE III

Example I is repeated except that an equivalent amount of $P_2O_5$ is added to the aqueous mixture in place of the $H_3PO_4$. The final catalyst formed has essentially the same chemical composition as that of Example I and has a surface area in excess of 150 $m^2$./gm. and a total pore volume in excess of 0.60 cc./gm. This product has utility as a hydrocarbon hydrotreating catalyst.

EXAMPLE IV

Example I is repeated except that an equivalent amount of phenylphosphonic acid is added to the aqueous mixture in place of the phosphoric acid and the mixture of water, hydrous alumina and acid in mulled at 130° F. for 15 minutes. The final catalyst formed which includes more than 0.5% by weight of phosphorous and has essentially the same metals content as the final catalyst of Example I, as well as surface area in excess of 100 $m^2$./gm. and a total pore volume in excess of 0.50 cc./gm., is found to have utility as a hydrocarbon hydrotreating catalyst.

EXAMPLE V

A calcined alumina is prepared as in Example I except that an equivalent amount of phosphorous acid is used in place of the phosphoric acid. The particles of calcined alumina are impregnated with catalytically effective amounts of nickel and tungsten using conventional techniques. The resulting final catalyst, which contains more than 0.5% by weight of phosphorous and has a surface area in excess of 100 $m^2$./gm. and a total pore volume in excess of 0.50 cc./gm., is found to have utility as a hydrocarbon hydrotreating catalyst.

That the final catalyst prepared as in Example I had a surface area and a total pore volume greater than that of the catalyst prepared in Example II is indicative of the fact that the catalyst prepared according to the present invention, e.g., Example I, has an improved hydrocarbon hydrotreating activity relative to the final catalyst of Example II. This improvement in hydrotreating activity is particularly surprising since the final catalysts of Examples I and II have similar chemical compositions. Thus, the present catalyst preparation method does provide catalysts with improved hydrocarbon hydrotreating activity.

In addition, Examples III to V illustrate that a wide variety of phosphorus acids may be used in the present method. Also, various metals and mixtures of metals in catalytically effective amounts may be used.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a method for producing an improved final catalyst comprising a major amount of alumina and a minor amount effective to promote hydrocarbon hydrotreating of at least one metal component selected from the group consisting of Group VIB metal components, Group VIII metal components and mixtures thereof which comprises the steps of contacting calcined alumina with at least one said metal-containing compound thereby forming a metal-containing material, calcining said metal-containing material and forming said final catalyst wherein the improvement which consists essentially of:
    (1) contacting an aqueous slurry consisting essentially of hydrous alumina with at least one phosphorus acid present in an amount sufficient to provide said final catalyst with a minor amount effective to increase the hydrocarbon hydrotreating activity of the final catalyst of phosphorus and forming a phosphorus-containing hydrous alumina, said phosphorus acid being selected from the group consisting of phosphoric acids, phosphonic acids, phosphinic acids, phosphenic acids, phosphoranic acids, phosphoranedioic acids, phosphoranetrioic acids, phosphoranetetroic acids, phosphoranepentoic acids and mixtures thereof, and
    (2) calcining said phosphorus-containing hydrous alumina and forming said calcined alumina.

2. The method of claim 1 wherein said phosphorus acid is at least partially water soluble and is present in the aqueous slurry of step (1) in an amount such that at least about 0.01 mole of phosphorus per mole of alumina (calculated as $Al_2O_3$) is present.

3. The method of claim 2 wherein said hydrous alumina predominates in a material selected from the group consisting of alumina monohydrate, alumina trihydrate, amorphous hydrous alumina and mixtures thereof, and said phosphorus acid is present in the aqueous slurry of step (1) in an amount such that from about 0.01 mole to about 2.0 moles of phosphorus per mole of alumina (calculated as $Al_2O_3$) is present.

4. The method of claim 3 wherein said final catalyst contains at least about 0.5% by weight of phosphorus and from about 0.01% to about 2% by weight of Group VIII platinum-group metal (calculated as the free metal).

5. The method of claim 4 wherein said final catalyst contains at least from 0.5% of phosphorus, from about 5% to about 40% by weight of said Group VIB metal component (calculated as the metal oxide) and from about 2% to about 15% by weight of Group VIII iron-group metal component (calculated as the free metal).

6. The method of claim 5 wherein said hydrous alumina predominates in a material selected from the group consisting of alumina monohydrates, amorphous hydrous alumina and mixtures thereof, said phosphorus acid is selected from the group consisting of phosphoric acids, phosphorous acids and mixtures thereof, and said final catalyst contains from about 10% to about 30% by weight of said Group VIB metal component (calculated as the metal oxide) and from about 4% to about 10% by weight of said Group VIII iron group metal component (calculated as the free metal).

7. The method of claim 6 wherein said phosphorus acid is selected from the group consisting of phosphoric acids and mixtures thereof, said Group VIB metal component is selected from the group consisting of tungsten component, molybdenum component, and mixtures thereof, and said Group VIII iron group metal component is selected from the group consisting of nickel component, cobalt component and mixtures thereof.

8. The method of claim 7 wherein the calcination of steps (2) and (4) occur at a temperature in the range of about 600° F. to about 1200° F. for a period of time of at least about ½ hour.

* * * * *